US009388856B2

(12) United States Patent
Sakamoto

(10) Patent No.: US 9,388,856 B2
(45) Date of Patent: Jul. 12, 2016

(54) THRUST BALL BEARING CAGE AND THRUST BALL BEARING

(71) Applicant: JTEKT CORPORATION, Osaka-shi, Osaka (JP)

(72) Inventor: Yasuhiro Sakamoto, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 7 days.

(21) Appl. No.: 14/626,189

(22) Filed: Feb. 19, 2015

(65) Prior Publication Data

US 2015/0252846 A1 Sep. 10, 2015

(30) Foreign Application Priority Data

Mar. 5, 2014 (JP) .................................. 2014-043059

(51) Int. Cl.
*F16C 19/30* (2006.01)
*F16C 33/38* (2006.01)
*F16C 19/12* (2006.01)

(52) U.S. Cl.
CPC ............ *F16C 33/3887* (2013.01); *F16C 19/305* (2013.01)

(58) Field of Classification Search
CPC ........ F16C 19/10; F16C 19/12; F16C 19/305; F16C 33/3837; F16C 33/3843; F16C 33/385; F16C 33/3856; F16C 33/3887
See application file for complete search history.

(56) References Cited

U.S. PATENT DOCUMENTS

| 848,776 | A | * | 4/1907 | Sisson | ..................... F16C 19/08 29/441.1 |
| 3,597,031 | A | * | 8/1971 | Bill | ........................ B01D 35/02 384/470 |
| 8,870,465 | B2 | * | 10/2014 | Miyamoto | .............. F16C 33/44 384/614 |
| 2011/0305411 | A1 | * | 12/2011 | Schweitzer | ........... F16C 19/163 384/495 |
| 2014/0016893 | A1 | * | 1/2014 | Nishikawa | ............ F16C 19/305 384/623 |

FOREIGN PATENT DOCUMENTS

| JP | 2594898 | Y2 | * | 5/1999 | ............. F16C 19/10 |
| JP | 2597027 | Y2 | * | 6/1999 | ............. F16C 19/10 |
| JP | 3952107 | B2 | * | 8/2007 | .......... F16C 33/3812 |
| JP | 2008-223970 | A |   | 9/2008 | |

\* cited by examiner

*Primary Examiner* — Alan B Waits
(74) *Attorney, Agent, or Firm* — Oliff PLC

(57) ABSTRACT

An end in an axial direction of a cage includes a first end face located so as to surround a pocket, a plurality of claw-shaped protrusions that protrude from a periphery of the pocket in a first end face outward in an axial direction and toward a center of the pocket and extend along the periphery at intervals, and a second end face that is connected to an end of the first end face, which is located on the opposite side of the first end face from the pocket side, via a step and is located further outward in the axial direction than the first end face. A recess is defined by the claw-shaped protrusions, the first end face, and the step.

8 Claims, 3 Drawing Sheets

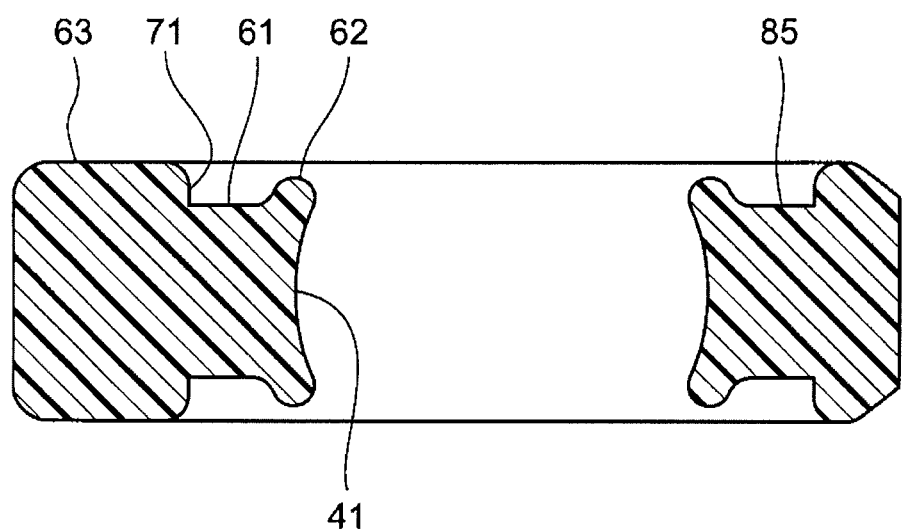

THRUST BALL BEARING CAGE AND THRUST BALL BEARING

INCORPORATION BY REFERENCE

The disclosure of Japanese Patent Application No. 2014-043059 filed on Mar. 5, 2014 including the specification, drawings and abstract, is incorporated herein by reference in its entirety.

BACKGROUND OF THE INVENTION

1. Field of the Invention

The invention relates to a thrust ball bearing cage. The invention also relates to a thrust ball bearing.

2. Description of Related Art

As a conventional thrust ball bearing cage (hereinafter referred to as a cage), there is a cage described in Japanese Patent Application Publication No. 2008-223970 (FIG. 3 in JP 2008-223970 A). The cage is formed of an annular member, and the annular member has a plurality of pockets arranged at intervals and extending through the annular member in an axial direction Each pocket has a plurality of claw-shaped protrusions, and the claw-shaped protrusions protrude at a periphery of an opening of the pocket so as to be formed in a convex shape. The claw-shaped protrusions are arranged at intervals at the periphery of the opening of the pocket. The axial height of each claw-shaped protrusion is increased as the claw-shaped protrusion gets closer to a center of the pocket from a radially outer end of the cage. The claw-shaped protrusions are provided so as to hold balls, thereby preventing the balls from coming out of the pockets.

The inventor found that the conventional cage had the following problems.

In the case of the conventional cage, the claw-shaped protrusions are less likely to be elastically deformed. When the balls are fitted in the pockets, the balls and the claw-shaped protrusions are therefore brought into contact with each other, whereby the claw-shaped protrusions are likely to be damaged.

In addition, in the conventional cage, the axial height of the claw-shaped protrusion is increased as the claw-shaped protrusion gets closer to the center of the pocket from the radially outer end of the cage. Lubricant is therefore less likely to be retained in the vicinity of the pockets. As a result, the lubricant is less likely to reach a sliding portion such as an inner face of the pocket.

SUMMARY OF THE INVENTION

An object of the invention is to provide a thrust ball bearing cage that is less likely to be damaged when balls are inserted into pockets even if a material having high rigidity is used for the cage, and is also capable of improving lubricity of a sliding portion, and to provide a thrust ball bearing having a cage that is less likely to be damaged and is also capable of improving the lubricity of the sliding portion.

According to an aspect of the invention, in a thrust ball bearing cage that is formed of an annular member having a plurality of pockets arranged at intervals in a circumferential direction, at least one of ends in an axial direction of the annular member includes a first end face located so as to surround the pocket, a plurality of claw-shaped protrusions that protrude from a periphery of the pocket in the first end face outward in the axial direction and toward a center of the pocket and extend along the periphery at intervals, and a second end face that is connected to an end of the first end face, which is located on the opposite side of the first end face from the pocket side, via a step and is located further outward in the axial direction than the first end face. A recess defined by the claw-shaped protrusions, the first end face, and the step is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a schematic sectional view as viewed from a direction shown by an arrow A in FIG. 2.

DETAILED DESCRIPTION OF EMBODIMENTS

Embodiments of the invention will be described in details below with reference to the drawings.

Figure 1:
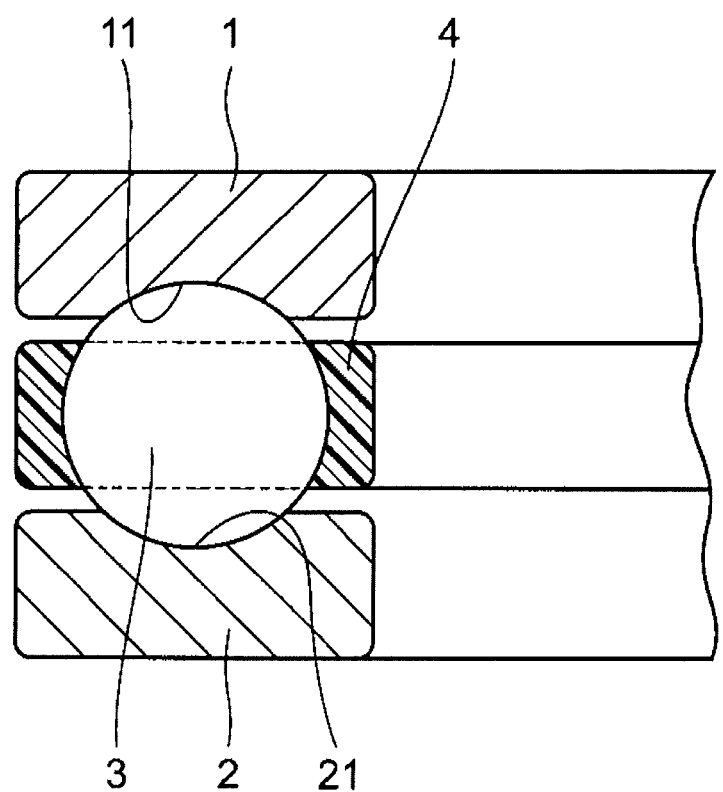
FIG. 1 is a schematic sectional view of a thrust ball bearing according to an embodiment of the invention, taken along the radial direction of the thrust ball bearing.

FIG. 1 is a schematic sectional view of a thrust ball bearing according to an embodiment of the invention, taken along the radial direction of the thrust ball bearing.

The thrust ball bearing (hereinafter referred to as a ball bearing) can receive an axial load from a rotary shaft of a refrigerator compressor, for example, and can be disposed in the presence of compressor oil as a refrigerant. The ball bearing includes a first bearing ring 1, a second bearing ring 2, a plurality of balls 3, and an annular thrust ball bearing cage (hereinafter referred to as a cage) 4 made of polyphenylene sulfide (PPS) resin.

The first bearing ring 1 has an annular raceway groove 11 on an end face located on one axial side, and the second bearing ring 2 has an annular raceway groove 21 on an end face located on the other axial side. The cage 4 is formed by injection molding. The balls 3 are arranged at intervals in a circumferential direction between the raceway groove 11 of the first bearing ring 1 and the raceway groove 21 of the second bearing ring 2 so as to be supported by the cage 4.

Figure 2:
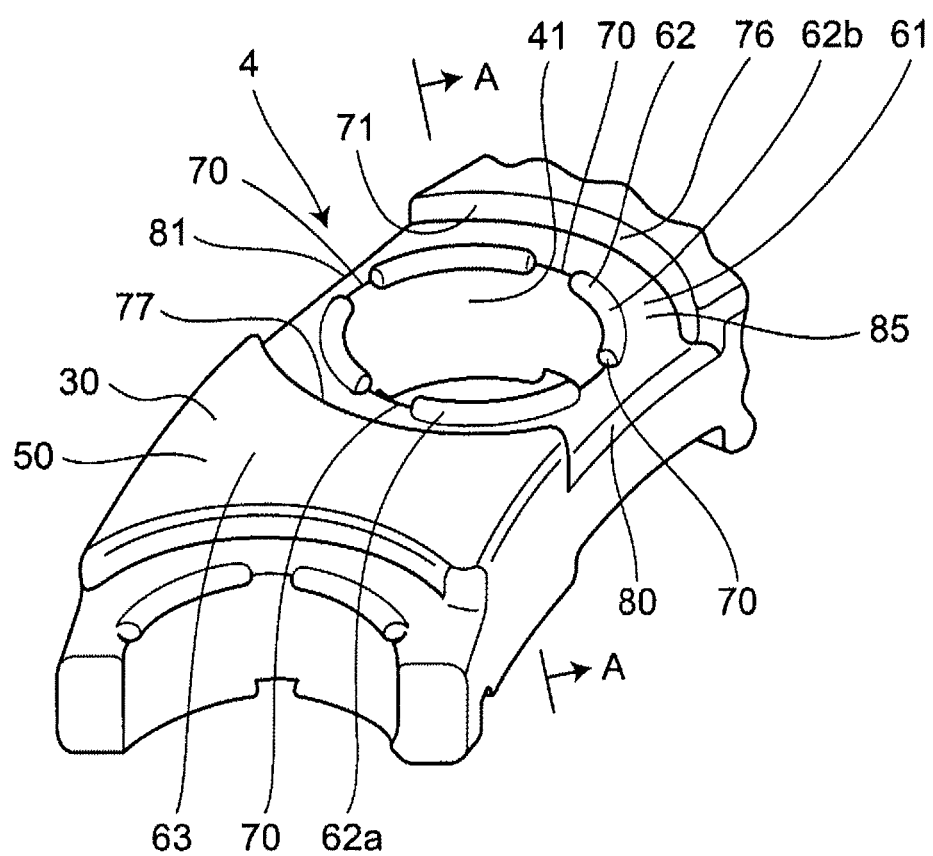
FIG. 2 is a perspective view showing a part of a thrust ball bearing cage included in the thrust ball bearing.

FIG. 2 is a perspective view showing a part of the cage 4 in a circumferential direction.

The cage 4 is formed of an annular member 30, and the annular member 30 has a plurality of pockets 41 arranged at intervals in the circumferential direction. An end face located on one axial side of the cage 4 and an end face located on the other axial side of the cage 4 have the same configuration. The end face on the one axial side and the end face on the other axial side are generally symmetric with respect to a plane (hereinafter referred to as a first plane). The cage 4 is generally symmetric with respect to the first plane.

Each of axial ends 50 of the annular member 30 of the cage 4 has a first end face 61, four claw-shaped protrusions 62, and a second end face 63. The first end face 61 is formed of a plane. The first end face 61 is generally parallel to the first plane.

As shown in FIG. 2, the first end face 61 is located so as to surround an entire periphery of the pocket 41.

The claw-shaped protrusions 62 protrude from the periphery of the pocket 41 in the first end face 61. The claw-shaped protrusions 62 extend along the periphery of the pocket 41. All the claw-shaped protrusions 62 have the same shape. The four claw-shaped protrusions 62 are arranged at intervals in a circumferential direction of the periphery of the pocket 41. The four claw-shaped protrusions 62 are arranged at regular intervals in the circumferential direction of the periphery of the pocket 41. As shown in FIG. 2, the four claw-shaped protrusions 62 are generally symmetric with respect to a plane (hereinafter referred to as a second plane) that extends in the radial and the axial directions of the cage 4 and includes a center of the pocket 41 partially surrounded by the four claw-shaped protrusions 62. The four claw-shaped protrusions 62 partially surrounding the periphery of the pocket 41, through which the second plane passes, are located so as to be apart from the second plane.

The cage 4 has four radially extending grooves 70, and the radially extending grooves 70 extend from the pocket 41 in a radial direction of the periphery of the pocket 41. The four radially extending grooves 70 are arranged at generally regular intervals in a circumferential direction of the pocket 41. All the four radially extending grooves 70 have the same shape. One of the four radially extending grooves 70 extends from the pocket 41 toward an inner side in radial direction of the cage 4. In other words, the four radially extending grooves 70 include one radially extending groove 70 that extends from the pocket 41 toward the inner side in the radial direction of the cage 4. The one radially extending groove 70 is located between two claw-shaped protrusions 62a, 62b that are adjacent to each other in the circumferential direction of the pocket 41, as shown in FIG. 2. An end face of the claw-shaped protrusion 62a and an end face of the claw-shaped protrusion 62b, which face each other in the circumferential direction, form two side faces of the one radially extending groove 70. A portion of the first end face 61, which is interposed between the two side faces, forms a bottom of the one radially extending groove 70.

The second end face 63 is connected to an end of the first end face 61, which is located on the opposite side of the first end face 61 from the pocket 41 side, via a step 71. The second end face 63 is located so as to partially surround the first end face 61 via the step 71. The second end face 63 is generally parallel to the first end face 61. The second end face 63 is located further outward in the axial direction of the cage 4 than the first end face 61.

As shown in FIG. 2, the first end face 61 extends to an end 80 located on the radially inner side of the cage 4 (the annular member 30) and extends to an end 81 on the radially outer side of the cage 4 (the annular member 30). In other words, the second end face 63 does not surround the entire periphery of the pocket 41 but partially surrounds the pocket 41, that is, surrounds only a part of the pocket 41 in the circumferential direction of the pocket 41.

The step 71 is formed of a first portion 76 and a second portion 77, and the first portion 76 and the second portion 77 are arranged at an interval. As shown in FIG. 2, each of the first and second portions 76, 77 has an arc shape. The first and second portions 76, 77 are curved so as to partially surround the pocket 41. The first and second portions 76, 77 extend from a radially inner end of the cage 4 to a radially outer end of the cage 4. The first and second portions 76, 77 face each other in the circumferential direction of the cage 4. The first and second portions 76, 77 are generally symmetric with respect to the second plane that passing through the pocket 41 partially surrounded by the portions 76, 77. The first and second portions 76, 77 are located so as to be apart from the second plane that passes through the pocket 41 partially surrounded by the portions 76, 77.

FIG. 3 is a sectional view taken along line A-A in FIG. 2 and is a sectional view of the cage 4, taken along a plane that includes the centers of the two claw-shaped protrusions 62 that face each other with the pocket 41 interposed therebetween, and extends in the axial direction of the cage 4.

As shown in FIG. 3, the claw-shaped protrusions 62 protrude from the periphery of the pocket 41 outward in the axial direction and toward the center of the pocket 41. A recess 85 is defined by the claw-shaped protrusions 62, the first end face 61 and the step 71. The claw-shaped protrusions 62, the step 71, and the first end face 61 form one side face of the recess 85, the other side face of the recess 85, and a bottom of the recess 85, respectively. As shown in FIG. 3, the second end face 63 is located further axially outward than the claw-shaped protrusions 62. The step 71 is tilted away from the center of the pocket 41 in a direction from the axially inner side toward the axially outer side. In FIG. 3, the step 71 is formed rounded.

According to the embodiment, the claw-shaped protrusions 62 do not have the annular configuration but have the configuration in which the claw-shaped protrusions 62 are arranged at intervals at the periphery of the pocket 41, and the recess 85 is provided further outward in the radial direction of the periphery of the pocket 41 than the claw-shaped protrusions 62. Providing the recess 85 thus reduces the thickness of the base end of the claw-shaped protrusion 62 compared to that of the conventional claw-shaped protrusion, thereby further facilitating the deformation of the claw-shaped protrusions 62. Accordingly, even if PPS resin having the high rigidity is used as the material of the cage 4, the cage 4 is less likely to be damaged when the balls 3 are inserted into the pockets 41, etc.

According to the embodiment, the recess 85 is provided further outward in the radial direction of the periphery of the pocket 41 than the claw-shaped protrusions 62, whereby the lubricant can be retained in the recess 85. Because the lubricant can be retained in the vicinity of the pocket 41, the lubricant is likely to pass from the recess 85 through the space between the claw-shaped protrusions 62 that are adjacent to each other in the circumferential direction of the pocket 41, etc., and the lubricant is thus likely to reach the inner face of the pocket 41, etc. Accordingly, the lubricity of a sliding portion can be improved.

According to the embodiment, the second end face 63 is located further axially outward than the claw-shaped protrusions 62 and protrudes further axially outward than the claw-shaped protrusions 62. The claw-shaped protrusions 62 can be thus protected by the second end face 63 and are less likely to be damaged when the cage 4 is transferred, etc. If the second end face is located further axially inward than the claw-shaped protrusions, the claw-shaped protrusions located at the highest position are brought into contact with a flat surface, etc. when the cage is placed on the flat surface during transfer, etc., for example. As a result, the claw-shaped protrusions having the low rigidity are more likely to be damaged.

According to the embodiment, the radially extending groove 70 extending from the pocket 41 toward the inner side in the radial direction of the cage 4 is provided. Centrifugal force of the cage 4 therefore can cause the lubricant to efficiently flow from the inner side in the radial direction of the cage 4 to the pocket 41 via the radially extending groove 70. Accordingly, the lubricity of the sliding portion can be further improved.

According to the embodiment, the radially extending groove 70 is provided in such a direction as to extend from the pocket 41 toward the inner side in the radial direction of the cage 4, and the claw-shaped protrusions 62 are not provided in such direction. The claw-shaped protrusions 62 are therefore not provided in the vicinity of the radially inner end of the cage 4. This facilitates manufacturing a die for injection molding of the cage 4, and releasing the cage 4 from the die.

According to the embodiment, the first end face 61 forming the bottom of the recess 85 extends to the ends 80, 81 located on the radially inner and outer sides of the annular member. The lubricant can thus flow from outside directly to the first end face 61 having the lower axial height than the second end face 63. The lubricant therefore can flow into the pocket more smoothly. In addition, the embodiment has synergistic effects of the first end face 61 extending to the radially inner and outer ends of the cage 4, and the radially extending groove 70 extending from the pocket 41 toward the inner side in the radial direction of the cage 4. The lubricant is far more likely to reach the pocket 41, and the lubricity of the sliding portion can be significantly improved.

In the embodiment, the four claw-shaped protrusions 62 are arranged at intervals in the circumferential direction of each pocket 41. However, the two, three, or five or more claw-shaped protrusions 62 may be arranged at intervals in the circumferential direction of each pocket 41.

In the embodiment, the claw-shaped protrusions 62 are arranged at regular intervals in the circumferential direction of each pocket 41. However, the claw-shaped protrusions 62 may be arranged at irregular intervals in the circumferential direction of each pocket 41.

In the embodiment, the claw-shaped protrusions 62 having the same configuration are arranged at the periphery of each pocket 41. However, the claw-shaped protrusions arranged at the periphery of each pocket may include two or more claw-shaped protrusions having different configurations.

In the embodiment, all the pockets 41 have the same configuration (the configuration and arrangement of the claw-shaped protrusions 62 partially surrounding the pocket 41). However, all the pockets 41 may not have the same configuration and may include two or more pockets having different configurations.

In the embodiment, the one axial end face of the cage 4 and the other axial end face of the cage 4 are generally symmetric with respect to the first plane. However, the one axial end face of the cage and the other axial end face of the cage may not be generally symmetric with respect to a plane. Alternatively, the one axial end face of the cage and the other axial end face of the cage may have different configurations. For example, the circumferential phase of the pocket in which the claw-shaped protrusions are provided may not be the same between one axial end of the cage and the other axial end of the cage, and the height of the claw-shaped protrusions from the first end face may be different between the one axial end of the cage and the other axial end of the cage.

In the embodiment, each of the first end face 61 and the second end face 63 is a flat surface. However, at least one of the first and second end faces may not be a flat surface and may be, for example, a curved surface or a surface formed by connecting a curved surface and a flat surface.

In this case, the requirement that the second end face is located further axially outward than the first end face is satisfied as long as the most axially inward position of the second end face is located further axially outward than the most axially outward position of the first end face.

In the embodiment, the second end face 63 is located further outward in the axial direction of the cage 4 than the claw-shaped protrusions 62. However, the most axially outward position of the second end face may be located further inward in the axial direction of the cage than the most axially outward position of the claw-shaped protrusions.

Alternatively, the axial position of the most axially outward position of the second end face may be the same as that of the most axially outward position of the claw-shaped protrusions.

In the embodiment, the cage 4 has the four radially extending grooves 70, and the radially extending grooves 70 extend from the pocket 41 in the radial direction of the periphery of the pocket 41. In addition, the four radially extending grooves 70 are arranged at generally regular intervals in the circumferential direction of the pocket 41, and all the four radially extending grooves 70 have the same shape. However, the cage may have the two or three, or five or more radially extending grooves extending in the radial direction of the periphery of the pocket. In addition, the radially extending grooves may be not arranged at generally regular intervals in the circumferential direction of the pocket. Furthermore, the radially extending grooves may include two or more radially extending grooves having different shapes.

In the embodiment, the claw-shaped protrusions 62 are not provided in such a direction as to extend from the pocket 41 toward the inner side in the radial direction of the cage 4, and the radially extending groove 70 extending from the pocket 41 toward the inner side in the radial direction of the cage 4 is provided in such direction. However, the claw-shaped protrusions may be provided in such a direction to extend from the pocket toward the inner side in the radial direction of the cage, and the radially extending groove extending from the pocket toward the inner side in the radial direction of the cage may not be provided in such direction. The claw-shaped protrusions may be provided in any circumferential phase of the pocket.

In the embodiment, the second end face 63 does not surround the entire periphery of the pocket 41 but surrounds only a part of the pocket 41 in the circumferential direction. However, the second end face may surround the entire periphery of the pocket. In this case, the first end face is separated from the radially inner and outer ends of the cage.

In the embodiment, the step 71 is tilted away from the center of the pocket 41 in a direction from the axially inner side toward the axially outer side. However, the step may extend exactly in the axial direction of the cage or may be tilted closer to the center of the pocket in a direction from the axially inner side toward the axially outer side. The step connecting the first and second end faces may be a flat surface, a curved surface, or a surface formed by connecting a flat surface and a curved surface.

In the embodiment, the claw-shaped protrusions 62 are provided on both the one axial end of the cage 4 and the other axial end of the cage 4. However, the claw-shaped protrusions may be provided only on one axial end of the cage.

In the embodiment, the cage 4 is made of PPS resin. However, the material of the cage may be resin materials other than PPS resin, such as nylon 46, nylon 66, phenol resin, polyetheretherketone (PEEK) resin, and may be any known resins that can be used for the cage. In addition, the material of the cage may be a metal.

The ball bearing according to the embodiment is mounted on the refrigerator compressor. However, the ball bearing according to the embodiment may be mounted on any household electrical appliances other than the refrigerator compressor, any industrial machines, or any construction machines. The ball bearing according to the embodiment may be used in order to receive the axial load from any rotary shafts. In addition, an embodiment obtained by combining two or more configurations of the configurations described in the embodiment and the modifications can be carried out.

According to the invention, there can be provided a thrust ball bearing cage that is less likely to be damaged when balls are inserted in pockets and is also capable of improving the lubricity of the balls, even if a material having the high rigidity is used for the cage.

What is claimed is:

1. A thrust ball bearing cage comprising an annular member having a plurality of pockets arranged at intervals in a circumferential direction, wherein:
   at least one of ends in an axial direction of the annular member includes
      a first end face located so as to surround the pocket,
      a plurality of claw-shaped protrusions that protrude from a periphery of the pocket in the first end face outward in the axial direction and toward a center of the pocket and extend along the periphery at intervals, and
      a second end face that is connected to an end of the first end face, which is located on the opposite side of the first end face from the pocket side, via a step and is located further outward in the axial direction than the first end face; and
   a recess is defined by the claw-shaped protrusions, the first end face, and the step.

2. The thrust ball bearing cage according to claim 1, wherein
   the second end face is located further outward in the axial direction than the claw-shaped protrusions.

3. The thrust ball bearing cage according to claim 2, wherein
   a radially extending groove that is located between the two claw-shaped protrusions adjacent to each other in a direction along the periphery and extends from the pocket toward an inner side in a radial direction of the annular member is provided.

4. A thrust ball bearing comprising:
   a first bearing ring having a raceway groove;
   a second bearing ring having a raceway groove;
   a plurality of balls arranged between the raceway groove of the first bearing ring and the raceway groove of the second bearing ring; and
   a thrust ball bearing cage according to claim 3 that holds the balls.

5. A thrust ball bearing comprising:
   a first bearing ring having a raceway groove;
   a second bearing ring having a raceway groove;
   a plurality of balls arranged between the raceway groove of the first bearing ring and the raceway groove of the second bearing ring; and
   a thrust ball bearing cage according to claim 2 that holds the balls.

6. The thrust ball bearing cage according to claim 1, wherein
   a radially extending groove that is located between the two claw-shaped protrusions adjacent to each other in a direction along the periphery and extends from the pocket toward an inner side in a radial direction of the annular member is provided.

7. A thrust ball bearing comprising:
   a first bearing ring having a raceway groove;
   a second bearing ring having a raceway groove;
   a plurality of balls arranged between the raceway groove of the first bearing ring and the raceway groove of the second bearing ring; and
   a thrust ball bearing cage according to claim 6 that holds the balls.

8. A thrust ball bearing comprising:
   a first bearing ring having a raceway groove;
   a second bearing ring having a raceway groove;
   a plurality of balls arranged between the raceway groove of the first bearing ring and the raceway groove of the second bearing ring; and
   a thrust ball bearing cage according to claim 1 that holds the balls.

* * * * *